US010847065B2

(12) United States Patent
Tian

(10) Patent No.: US 10,847,065 B2
(45) Date of Patent: Nov. 24, 2020

(54) FLEXIBLE DISPLAY DEVICE

(71) Applicant: Yungu (Gu'an) Technology Co., Ltd., Langfang (CN)

(72) Inventor: Wei Tian, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/361,932

(22) Filed: Mar. 22, 2019

(65) Prior Publication Data

US 2019/0221142 A1    Jul. 18, 2019

Related U.S. Application Data

(63) Continuation of application No. PCT/CN2019/071587, filed on Jan. 14, 2019.

(30) Foreign Application Priority Data

May 21, 2018    (CN) .......................... 2018 1 0497961

(51) Int. Cl.
    G09F 9/30     (2006.01)
    H05K 5/00     (2006.01)
    G06F 1/16     (2006.01)

(52) U.S. Cl.
    CPC ............ G09F 9/301 (2013.01); G06F 1/1652 (2013.01); H05K 5/0017 (2013.01)

(58) Field of Classification Search
    CPC ...... H05K 5/0017; G09F 9/301; G06F 1/1652
    See application file for complete search history.

(56) References Cited

U.S. PATENT DOCUMENTS

| 7,242,445 B2 * | 7/2007 | Akiyama .......... G02F 1/133305 |
| | | 349/158 |
| 10,194,540 B2 * | 1/2019 | Sun ...................... H01L 51/5237 |
| 10,201,089 B2 * | 2/2019 | Huitema ................. G09F 21/02 |
| 2005/0285963 A1 * | 12/2005 | Misawa ............... H04N 5/2251 |
| | | 348/333.06 |
| 2016/0118616 A1 | 4/2016 | Hiroki et al. |
| 2017/0061836 A1 | 3/2017 | Kim et al. |

FOREIGN PATENT DOCUMENTS

| CN | 103926979 A | 7/2014 |
| CN | 104318869 A | 1/2015 |
| CN | 104733498 A | 6/2015 |
| CN | 105518768 A | 4/2016 |
| CN | 205696106 U | 11/2016 |
| CN | 106297568 A | 1/2017 |

(Continued)

OTHER PUBLICATIONS

Chinese Patent Office, the First Office Action for Chinese Application No. 201810497961.6 dated May 17, 2019; list of references cited translated.

*Primary Examiner* — Binh B Tran
*Assistant Examiner* — Hiram E Gonzalez
(74) *Attorney, Agent, or Firm* — Rimon PC

(57) ABSTRACT

Embodiments of the present application provide a flexible display device which includes an elastic pressure plate and a flexible display screen. The flexible display screen is disposed on a first surface of the elastic pressure plate. The flexible display screen is bent and flattened through the elastic pressure plate.

16 Claims, 2 Drawing Sheets

(56) References Cited

FOREIGN PATENT DOCUMENTS

| | | |
|---|---|---|
| CN | 106328003 A | 1/2017 |
| CN | 106448466 A | 2/2017 |
| CN | 106455371 A | 2/2017 |
| CN | 106875847 A | 6/2017 |
| CN | 107067982 A | 8/2017 |
| CN | 107102692 A | 8/2017 |
| CN | 107564423 A | 1/2018 |
| CN | 206920992 U | 1/2018 |
| CN | 207115888 U | 3/2018 |
| CN | 108831296 A | 11/2018 |

* cited by examiner

FLEXIBLE DISPLAY DEVICE

CROSS-REFERENCE TO RELATED APPLICATIONS

This application is a continuation application of International Application No. PCT/CN2019/071587, filed on Jan. 14, 2019 which claims priority to CN Patent Application No. 201810497961.6, filed on May 21, 2018. All of the aforementioned applications are hereby incorporated by reference in their entireties.

TECHNICAL FIELD

Embodiments of the present application relate to the field of display technology, and in particular to a flexible display device.

BACKGROUND

With the maturity of flexible display technology, a flexible display device with a flexible display screen, e.g., a flexible wristwatch, has attracted more and more attention in the market. However, the flexible display screen has an ultimate bending radius. When a bending radius is less than the ultimate bending radius, the flexible display screen will be damaged because of excessive bending.

Therefore, how to avoid damage caused by the excessive bending of the flexible display screen has become an urgent problem to be solved.

SUMMARY

In view of the above, embodiments of the present application provide a flexible display device in order to solve the problem of damage caused by excessive bending of a flexible display screen in a bent state in the prior art.

An aspect of the present application provides a flexible display device, which includes an elastic pressure plate, and a flexible display screen disposed on a first surface of the elastic pressure plate. The flexible display screen is bent and flattened through the elastic pressure plate.

In an embodiment of the present application, the flexible display device further includes a plurality of position limiting teeth. Root portions of the plurality of position limiting teeth are disposed perpendicular to the first surface and in at least one row along an extension direction of a long edge of the elastic pressure plate.

In an embodiment of the present application, the root portions of the plurality of position limiting teeth perpendicular to the first surface are disposed in two parallel rows and on opposite sides of the first surface.

In an embodiment of the present application, the plurality of position limiting teeth are formed by following steps: forming a concave and convex structure on the opposite sides of the elastic pressure plate by a stamping process; and respectively bending the opposite sides having the convex and concave structure toward one side which is perpendicular to the first surface to form the plurality of position limiting teeth.

In an embodiment of the present application, the plurality of position limiting teeth are fixed on the opposite sides of the elastic pressure plate by welding.

In an embodiment of the present application, the position limiting tooth further includes an extension portion extending from a top end of the root portion along the extension direction of the long edge of the elastic pressure plate. A predetermined gap is disposed between extension portions of two adjacent position limiting teeth, and a size of the predetermined gap is determined with reference to an ultimate bending radius of the flexible display screen.

In an embodiment of the present application, both ends of the extension portion extending along the extension direction of the long edge of the elastic pressure plate are perpendicularly bent toward inside of the flexible display device in a predetermined size.

In an embodiment of the present application, a thickness of the elastic pressure plate is in a range of 0.1 mm to 0.5 mm.

In an embodiment of the present application, both the plurality of position limiting teeth and the elastic pressure plate are made of super-elastic titanium alloy or super-elastic iron-carbon alloy.

In an embodiment of the present application, the flexible display device further includes a flexible casing. The flexible casing wraps the elastic pressure plate and the flexible display screen, a second surface of the elastic pressure plate is in fixed contact with an inner surface of the flexible casing, the elastic pressure plate and the flexible display screen are bent and flattened through the flexible casing, and the first surface is opposite to the second surface.

In an embodiment of the present application, the flexible casing is made of at least one of silicone rubber and thermoplastic polyurethane elastomer.

In an embodiment of the present application, the elastic pressure plate is in non-fixed contact with the flexible display screen.

In an embodiment of the present application, a size of the predetermined gap is in a range of 0.1 mm to 5 mm.

In an embodiment of the present application, a size of the position limiting tooth along a direction perpendicular to the first surface is in a range of 1 mm to 5 mm.

In an embodiment of the present application, the flexible casing is elastically fixed to the elastic pressure plate.

In an embodiment of the present application, the flexible casing and the elastic pressure plate are elastically fixed by elastic glue.

In an embodiment of the present application, the elastic glue includes glass glue.

By using the technical scheme of the present application, the flexible display screen is disposed on the first surface of the elastic pressure plate, and the flexible display screen is bent and flattened through the elastic pressure plate, so that when the bending radius of the flexible display screen is less than the ultimate bending radius, a downward pressure applied to the flexible display screen by the elastic pressure plate can effectively reduce the tensile stress applied to the tensile side of the flexible display screen, thereby effectively alleviating damage caused by excessive bending of the flexible display screen in a bent state.

DESCRIPTIONS OF REFERENCE NUMBERS

Figure 1:
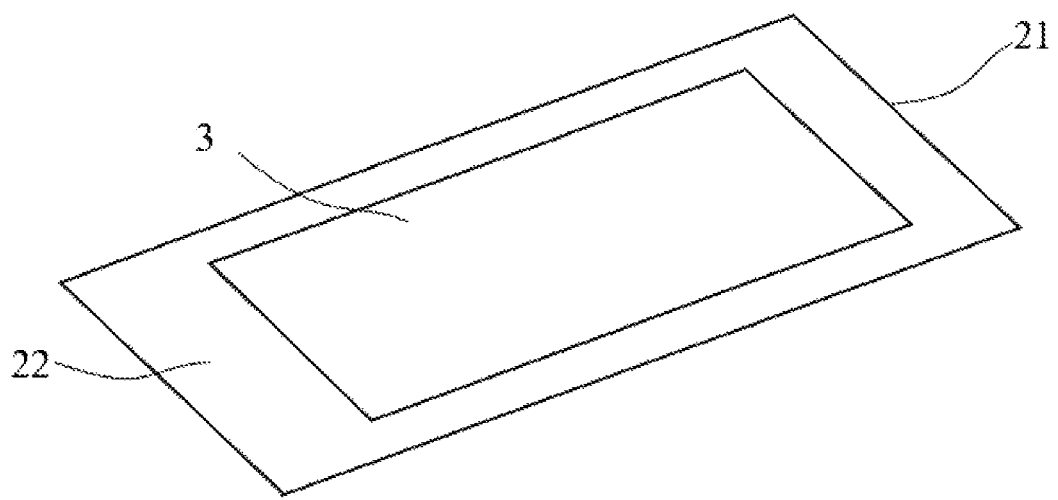
FIG. 1 is a schematic structural diagram of a flexible display device in a flat state according to an embodiment of the present application.

Flexible casing 1, position limiting mechanism 2, elastic pressure plate 21, first surface 22, position limiting tooth 23, extension portion 231, contact surface 2311, root portion 232, second surface 24, flexible display screen 3, and predetermined gap 4.

DETAILED DESCRIPTION

Technical solutions in embodiments of the present application are clearly and completely described in the following with reference to accompanying drawings in the embodiments of the present application. Obviously, the described embodiments are only a part of embodiments of the present application, and are not all embodiments. All other embodiments obtained by those skilled in the art based on the embodiments of the present application without creative efforts shall fall within the protection scope of the present application.

Where possible, the same or similar parts mentioned in the various parts of the drawings will be marked with the same reference numbers.

FIG. 1 is a schematic structural diagram of a flexible display device in a flat state according to an embodiment of the present application.

As shown in FIG. 1, a flexible display device may include an elastic pressure plate 21 and a flexible display screen 3. The flexible display screen 3 is disposed on a first surface 22 of the elastic pressure plate 21. The flexible display screen 3 is bent and flattened through the elastic pressure plate 21.

Specifically, according to a laminated structure, i.e., in a thickness direction of the flexible display device, the elastic pressure plate 21 may be located on a surface in which a display area of the flexible display screen 3 is located. When the flexible display screen 3 is in a bent state, the surface in which the display area is located may be on a tensile side of the flexible display screen 3. Since the first surface 22 of the elastic pressure plate 21 and the tensile side may be in contact with each other, the flexible display screen 3 can have a supporting effect on the elastic pressure plate 21 when the elastic pressure plate 21 is bent. At the same time, the elastic pressure plate 21 can also have a downward pressing effect on the flexible display screen 3, i.e., the elastic pressure plate 21 can reduce tensile stress applied to the tensile side of the flexible display screen 3, and can also ensure that there is no relative sliding between the elastic pressure plate 21 and the flexible display screen 3, thereby achieving that a bending radius of the flexible display screen 3 can become smaller as a bending radius of the elastic pressure plate 21 becomes smaller. When the elastic pressure plate 21 is restored from a bent state to a flat state, since the elastic pressure plate 21 is in non-fixed contact with the flexible display screen 3, the supporting effect of the flexible display screen 3 on the elastic pressure plate 21 can be eliminated. At the same time, the downward pressing effect of the elastic pressure plate 21 on the flexible display screen 3 can also be eliminated. At this time, the elastic pressure plate 21 is restored to the flat state, and the flexible display screen 3 is also restored to the flat state with the elastic pressure plate 21, i.e., the bending radius of the flexible display screen 3 may become larger as the bending radius of the elastic pressure plate 21 becomes larger. Therefore, the bending of the elastic pressure plate 21 can control the bending of the flexible display screen 3 during both a bending process and a restoring process, i.e., the flexible display screen 3 can be bent and flattened through the elastic pressure plate 21.

Further, during a process in which the elastic pressure plate 21 is restored from the bent state to the flat state, there may be a gap between the flexible display screen 3 and the elastic pressure plate 21, i.e., there may be relative sliding between the flexible display screen 3 and the elastic pressure plate 21, thereby avoiding damage caused by a friction between the flexible display screen 3 and the elastic platen 21 to the flexible display screen 3.

In addition, the flexible display device may be any one of a flexible wrist strap, a flexible bracelet, a flexible wrist watch, a mobile phone, a tablet computer and the like. In order to adapt to a development of a portable wearable device, the flexible display device type is not limited herein. In addition, the flexible display screen 3 may be an Organic Light Emitting Diode (OLED) display screen, and further may be an Active Matrix Organic Light Emitting Diode (AMOLED) display screen or the like. The flexible display screen 3 type is not limited herein.

By using the technical scheme of the present application, the flexible display screen 3 is disposed on the first surface 22 of the elastic pressure plate 21, and the flexible display screen 3 is bent and flattened through the elastic pressure plate 21, so that when the bending radius of the flexible display screen is less than the ultimate bending radius, a downward pressure applied to the flexible display screen 3 by the elastic pressure plate 21 can effectively reduce the tensile stress applied to the tensile side of the flexible display screen 3, thereby effectively alleviating damage caused by excessive bending of the flexible display screen 3.

Figure 2:
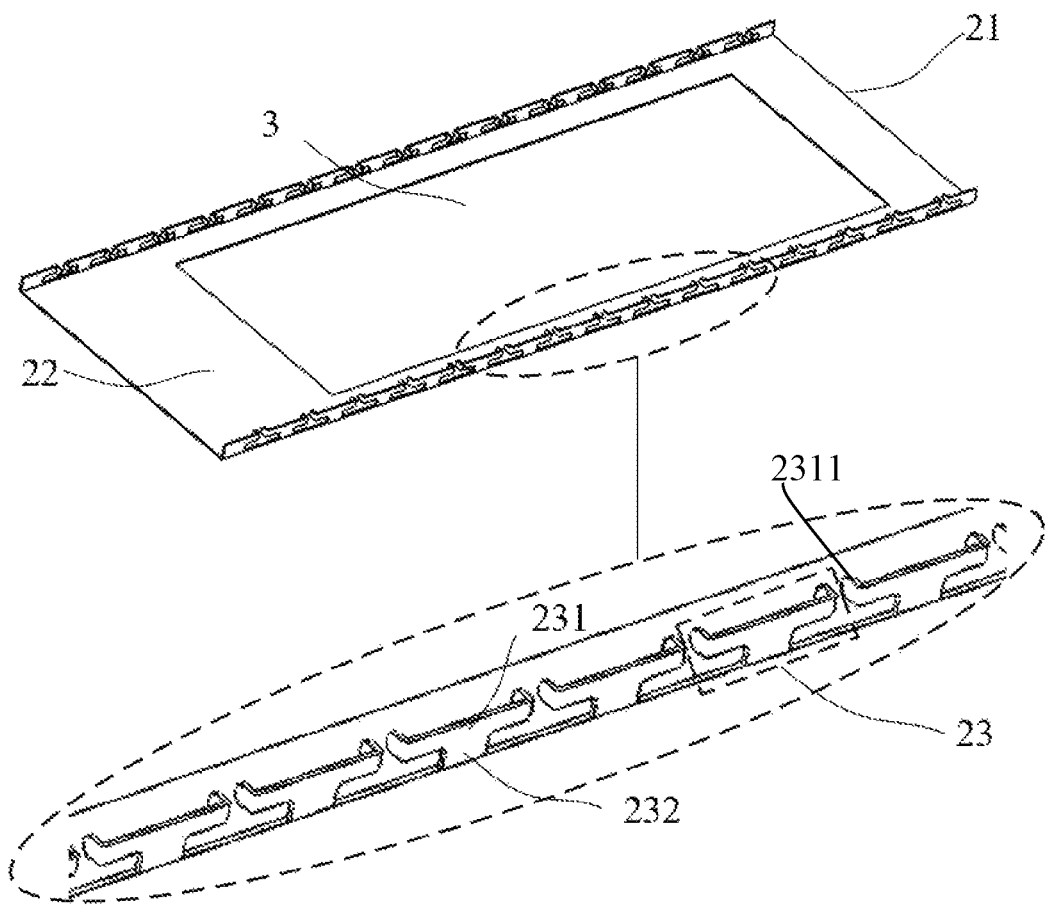
FIG. 2 is a schematic structural diagram of a flexible display device in a flat state according to another embodiment of the present application.
Figure 3:
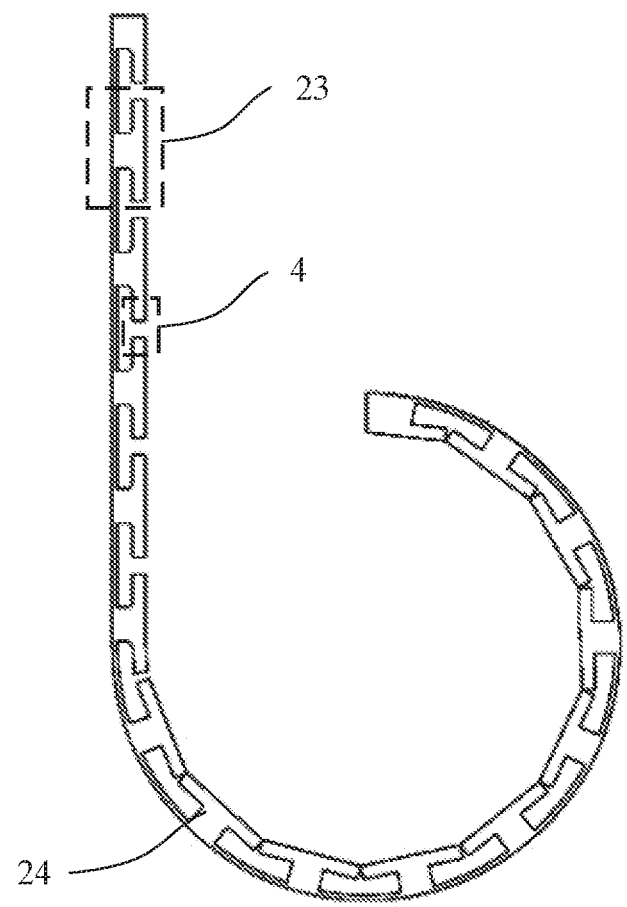
FIG. 3 is a schematic structural diagram of a flexible display device in a bent state according to still another embodiment of the present application.

FIG. 2 is a schematic structural diagram of a flexible display device in a flat state according to another embodiment of the present application. FIG. 3 is a schematic structural diagram of a flexible display device in a bent state according to still another embodiment of the present application.

As shown in FIGS. 2 and 3, the flexible display device may further include a plurality of position limiting teeth 23. Root portions 232 of the plurality of position limiting teeth 23 are disposed perpendicular to the first surface 22 and in at least one row along an extension direction of a long edge of the elastic pressure plate 21. In this case, an entirety of the plurality of position limiting teeth 23 and the elastic pressure plate 21 may be called a position limiting mechanism 2.

For the plurality of position limiting teeth 23 of the position limiting mechanism 2, the plurality of position limiting teeth 23 disposed perpendicularly to the first surface 22 refers to the plurality of position limiting teeth 23 protruding from the first surface 22. Further, the plurality of position limiting teeth 23 may be fixed on a surface opposite to the display area of the flexible display screen 3, and the surface is the first surface 22. The plurality of position limiting teeth 23 may also be fixed on at least one end face of two opposite end faces which are corresponding to a non-display area of the flexible display screen 3. The fixed position of the plurality of position limiting teeth 23 is not limited herein. When the flexible display screen 3 is in the flat state, there may be a gap between two adjacent position limiting teeth 23. When the flexible display device is bent, whether a part of the flexible display device is bent or the whole flexible display device is bent, two adjacent position limiting teeth 23 of the position limiting mechanism 2 of a bending region can be close to each other. When two adjacent position limiting teeth 23 are in contact with each other, the position limiting teeth 23 that are in contact with each other can limit further bending of the flexible display screen 3, so that a bending radius of the flexible display screen 3 approaching an ultimate bending radius can be avoided, thereby avoiding damage caused by excessive bending of the flexible display screen. In this case, the bending radius of the flexible display screen 3 approaching the ultimate bending radius may refer to the fact that the tensile stress or compressive stress of the flexible display screen 3 may approach a limit value of the tensile stress or compressive stress that can be withstood by the flexible display screen 3.

Further, when the flexible display device is bent, the elastic pressure plate 21 can reduce the tensile stress applied to a tensile side of the flexible display screen 3, the plurality of position limiting teeth 23 can reduce the compressive stress on a compressive side of the flexible display screen 3, and in the laminated structure, the flexible display screen 3 can be in a neutral layer, i.e., a layer with the minimum stress, thereby further enhancing flexibility of the flexible display screen 3.

The shape of the position limiting tooth 23 is not limited herein as long as the bending of the flexible display screen 3 can be limited. For example, the shape of the position limiting tooth 23 may be a T-shape, a rectangle, a triangle, a diamond, a polygon or the like.

In the embodiments of the present application, by disposing the elastic pressure plate 21 having the position limiting mechanism 2 on the surface of the flexible display screen 3, the tensile stress of the flexible display screen 3 during the bending can be reduced; by disposing the plurality of position limiting teeth 23 perpendicular to the first surface 22 of the elastic pressure plate 21, the bending of the flexible display screen 3 can be limited, thereby avoiding damage caused by a reason that the bending radius of the flexible display screen 3 is less than the ultimate bending radius when the flexible display screen 3 is bent; by a cooperation of the elastic pressure plate 21 and the plurality of position limiting teeth 23, a bending characteristics of the flexible display device can be doubly ensured. In addition, since the elastic pressure plate 21 is in the form of a plate, the plurality of position limiting teeth 23 may not occupy space in a thickness direction of the flexible display device, thereby effectively reducing the thickness of the flexible display device.

In another embodiment of the present application, the root portions 232 of the plurality of position limiting teeth 23 perpendicular to the first surface are disposed in two parallel rows and on opposite sides of the first surface 22.

Specifically, as shown in FIG. 2, the opposite sides of the first surface 22 may be two opposite end faces of the elastic pressure plate 2. The two opposite end faces refers to the end faces where bending deformation may occur, and the two end faces don't include the display area. The two opposite end faces may also be two opposite edges of the first surface 22, and the two opposite edges refers to the edges where bending deformation may occur, which is also not limited herein.

By disposing the plurality of position limiting teeth 23 in two parallel rows on the opposite sides of the first surface 22 perpendicularly, a position limiting effect of the position limiting mechanism 2 may be more uniform and effective, thereby avoiding uneven stress of the flexible display screen 3 during the bending.

In another embodiment of the present application, the plurality of position limiting teeth 23 are formed by following steps: forming a concave and convex structure on the opposite sides of the elastic pressure plate 21 by a stamping process; and respectively bending the opposite sides of the elastic pressure plate 21 having the convex and concave structure toward one side which is perpendicular to the first surface 22 to form the plurality of position limiting teeth 23.

Specifically, the above-mentioned convex and concave structure may correspond to original shapes of the plurality of position limiting teeth 23 before being bent. The concave portion may correspond to the gap between two adjacent position limiting teeth 23, and the convex portion may correspond to the position limiting tooth 23.

The elastic pressure plate 21 and the plurality of position limiting teeth 23 are formed by the stamping process, and the method is simple and a forming effect is remarkable.

In another embodiment of the present application, the plurality of position limiting teeth 23 are fixed on the opposite sides of the elastic pressure plate 21 by welding.

Specifically, the forming process of the elastic pressure plate 21 and the plurality of position limiting teeth 23 may be not only the stamping process but also the welding process. For example, the welding method may be laser welding, ultrasonic welding, or the like. The forming process of the elastic pressure plate 21 and the plurality of position limiting teeth 23 may not be limited herein.

In an embodiment of the present application, the position limiting tooth 23 further includes an extension portion 231 extending from a top end of the root portion 232 along the extension direction of the long edge of the elastic pressure plate 21. A predetermined gap 4 is disposed between extension portions 231 of two adjacent position limiting teeth 23, and a size of the predetermined gap 4 is determined with reference to the ultimate bending radius of the flexible display screen 3.

Specifically, as shown in FIGS. 2 and 3, to facilitate the description, a shape formed by the root portion 232 and the extension portion 231 of the position limiting tooth 23 may be called a T-shape. A size of the root portion 232 of the position limiting tooth 23 in the thickness direction of the flexible display device may be designed to be relatively short so that the thickness of the flexible display device can be minimized. The predetermined gap 4 refers to a space between two adjacent extension portions 231 along the extension direction of the long edge of the elastic pressure plate 21, and a height of the position limiting tooth 23 refers to a size of the position limiting teeth 23 along the thickness direction of the flexible display device. The thickness direction of the flexible display device may refer to a direction perpendicular to the first surface 22 of the flexible display device. When the height of the position limiting tooth 23 is fixed, the size of the predetermined gap 4 may be determined according to the ultimate bending radius of the flexible display screen 3. The flexible display screen 3 is in the flat state, if the ultimate bending radius of the flexible display screen 3 is relatively large, the size of the predetermined gap 4 is relatively small, and if the ultimate bending radius of the flexible display screen 3 is relatively small, the size of the predetermined gap 4 is relatively large. For example, the size of the predetermined gap 4 may be in a range of 0.1 mm to 5 mm.

In addition, when the size of the predetermined gap 4 is fixed, if the ultimate bending radius of the flexible display screen 3 is relatively large, the height of the position limiting tooth 23 is relatively high, and if the ultimate bending radius of the flexible display screen 3 is relatively small, the height of the position limiting tooth 23 is relatively low. For example, the height of the position limiting tooth 23 may be in a range of 1 mm to 5 mm.

In another embodiment of the present application, both ends of the extension portion 231 extending along the extension direction of the long edge of the elastic pressure plate 21 are perpendicularly bent toward inside of the flexible display device in a predetermined size.

Specifically, when forming the position limiting teeth 23 of the elastic pressure plate 21, a certain space between two extension portions 231 may be maintained first, and at this time the space is not the predetermined gap 4. Then, both ends of each extension portion 231 extending along the extension direction of the long edge of the elastic pressure plate 21 may be bent toward the inside of the flexible display device in a predetermined size to form contact surfaces 2311, and at this time the space between two adjacent extension portions 231 is the predetermined gap 4. When the flexible display device is bent, two adjacent extension portions 231 may be in contact with each other through two adjacent contact surfaces 2311, thereby achieving a limiting effect by the contact of two adjacent contact surfaces 2311. Since an area of the contact surface 2311 is larger, the effect of limiting the bending of the flexible display device can be more significant.

It should be understood that if the size between two adjacent extension portions 231 is sufficient to satisfy a limiting requirement, for example, the position limiting tooth 23 has a certain thickness, or, the position limiting tooth 23 has a certain hardness, and so on. Both ends of each extension portion 231 extending along the extension direction of the long edge of the elastic pressure plate 21 may not be bent toward the inside of the flexible display device in the predetermined size, i.e., there is no need to form the contact surface 2311, which is not limited herein.

It should be understood that if the shape of the position limiting tooth 23 is not a T-shape, both ends of the extension portion 231 may also be bent toward the inside of the flexible display, which is not limited herein.

In another embodiment of the present application, a thickness of the elastic pressure plate 21 may be in a range of 0.1 mm to 0.5 mm.

Specifically, the thickness of the elastic pressure plate 21 may preferably be in the range of 0.1 mm to 0.5 mm. In this size range, the elastic pressure plate 21 can both press the flexible display screen 3 and reduce the thickness of the flexible display device.

In another embodiment of the present application, both the position limiting tooth 23 and the elastic pressure plate 21 are made of super-elastic titanium alloy or super-elastic iron-carbon alloy.

Specifically, the titanium alloy may include shape memory alloy in order to ensure a relatively good deformation recovery ability. In addition, the iron-carbon alloy may preferably include stainless steel, thereby keeping a perfect appearance.

Figure 4:
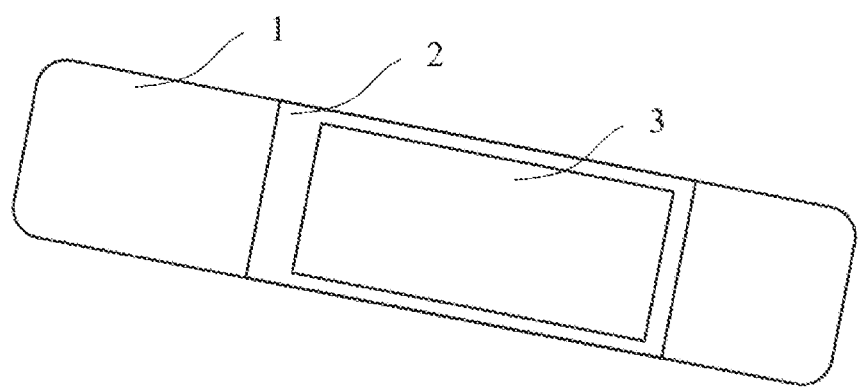
FIG. 4 is a schematic structural diagram of a flexible display device according to an embodiment of the present application.

FIG. 4 is a schematic structural diagram of a flexible display device according to an embodiment of the present application.

In an embodiment of the present application, as shown in FIG. 4, the flexible display device further includes a flexible casing 1. The flexible casing 1 wraps the elastic pressure plate 21 of the position limiting mechanism 2 and the flexible display screen 3. A second surface 24 of the elastic pressure plate 21 is in fixed contact with an inner surface of the flexible casing 1, the elastic pressure plate 21 and the flexible display screen 3 are bent and flattened through the flexible casing 1, the bending of the flexible casing 1 controls the bending of the elastic pressure plate 21 and the bending of the flexible display screen 3, and the first surface 22 is opposite to the second surface 24.

Specifically, a fixed relationship between the flexible casing 1 and the elastic pressure plate 21 may be elastically fixed, i.e., there may be no relative displacement between the flexible casing 1 and the elastic pressure plate 21, and there may be elastic deformation in a fixed position between the flexible casing 1 and the elastic pressure plate 21 when being bent. For example, the flexible casing 1 and the elastic pressure plate 21 are fixed by elastic glue, and further, the elastic glue may be glass glue. The specific fixing method is not limited herein. In addition, the flexible casing 1 may be used to wrap other components of the flexible display device and protect these components.

In another embodiment of the present application, the flexible casing 1 is made of at least one of silicone rubber and thermoplastic polyurethane elastomer.

Specifically, in order to ensure that the flexible casing 1 can be deformable and protect other components of the flexible display device, the flexible casing 1 may preferably be made of at least one of the silicone rubber and the thermoplastic polyurethane elastomer.

The above descriptions are merely preferred embodiments of the present application, but are not intended to limit the present application. Any modification, equivalent replacement, or improvement made without departing from the spirit and principle of the present application shall fall within the protection scope of the present application.

What is claimed is:

1. A flexible display device, comprising:
   an elastic pressure plate;
   a flexible display screen disposed on a first surface of the elastic pressure plate, the flexible display screen being bent and flattened via the elastic pressure plate; and
   a plurality of position limiting teeth each having a root portion and an extension portion, the root portions of the plurality of position limiting teeth being disposed perpendicular to the first surface and in at least one row along an extension direction of a long edge of the elastic pressure plate;
   wherein both ends of each extension portion are bent toward an inside of the flexible display device to form a pair of contact surfaces, and wherein when the flexible display device is bent, two adjacent extension portions are in contact with each other through two adjacent contact surfaces, to improve bending effect.

2. The flexible display device of claim 1, wherein the root portions of the plurality of position limiting teeth perpendicular to the first surface are disposed in two parallel rows and on opposite sides of the first surface.

3. The flexible display device of claim 2, wherein the plurality of position limiting teeth are formed by following steps:
   forming a concave and convex structure on the opposite sides of the elastic pressure plate by a stamping process; and
   bending the opposite sides having the convex and concave structure toward one side perpendicular to the first surface, respectively, to form the plurality of position limiting teeth.

4. The flexible display device of claim 2, wherein the plurality of position limiting teeth are fixed on the opposite sides of the elastic pressure plate by welding.

5. The flexible display device of claim 1, wherein the position limiting tooth further comprises:

the extension portion extending from a top end of the root portion along the extension direction of the long edge of the elastic pressure plate;

a predetermined gap is disposed between extension portions of two adjacent position limiting teeth, and a size of the predetermined gap is determined with reference to an ultimate bending radius of the flexible display screen.

6. The flexible display device of claim 5, wherein both ends of the extension portion extending along the extension direction of the long edge of the elastic pressure plate are perpendicularly bent toward inside of the flexible display device in a predetermined size.

7. The flexible display device of claim 5, wherein a size of the predetermined gap is in a range of 0.1 mm to 5 mm.

8. The flexible display device of claim 1, wherein a thickness of the elastic pressure plate is in a range of 0.1 mm to 0.5 mm.

9. The flexible display device of claim 1, wherein both the plurality of position limiting teeth and the elastic pressure plate are made of super-elastic titanium alloy or super-elastic iron-carbon alloy.

10. The flexible display device of claim 1, further comprising a flexible casing, the flexible casing wrapping the elastic pressure plate and the flexible display screen, a second surface of the elastic pressure plate being in fixed contact with an inner surface of the flexible casing, the elastic pressure plate and the flexible display screen being bent and flattened through the flexible casing, the first surface being opposite to the second surface.

11. The flexible display device of claim 10, wherein the flexible casing is elastically fixed to the elastic pressure plate.

12. The flexible display device of claim 11, wherein the flexible casing and the elastic pressure plate are elastically fixed by elastic glue.

13. The flexible display device of claim 12, wherein the elastic glue comprises glass glue designed for glass surfaces.

14. The flexible display device of claim 10, wherein the flexible casing is made of at least one of silicone rubber and thermoplastic polyurethane elastomer.

15. The flexible display device of claim 1, wherein the elastic pressure plate is in adjustable contact with the flexible display screen.

16. The flexible display device of claim 1, wherein a size of the position limiting tooth along a direction perpendicular to the first surface is in a range of 1 mm to 5 mm.

* * * * *